United States Patent
White et al.

(10) Patent No.: US 10,436,231 B2
(45) Date of Patent: Oct. 8, 2019

(54) SWAGELESS TURNBUCKLE ASSEMBLY

(71) Applicant: Keuka Studios, Inc., Honeoye Falls, NY (US)

(72) Inventors: Daniel P. White, Honeoye Falls, NY (US); Jason Daniel White, Fairport, NY (US)

(73) Assignee: Keuka Studios, Inc., Honeoye Falls, NY (US)

( * ) Notice: Subject to any disclaimer, the term of this patent is extended or adjusted under 35 U.S.C. 154(b) by 159 days.

(21) Appl. No.: 15/612,064

(22) Filed: Jun. 2, 2017

(65) Prior Publication Data

US 2018/0003202 A1     Jan. 4, 2018

Related U.S. Application Data

(60) Provisional application No. 62/355,998, filed on Jun. 29, 2016.

(51) Int. Cl.
*F16G 11/00* (2006.01)
*F16B 2/06* (2006.01)
(Continued)

(52) U.S. Cl.
CPC .............. *F16B 2/065* (2013.01); *F16B 2/14* (2013.01); *F16G 11/025* (2013.01); *F16G 11/04* (2013.01)

(58) Field of Classification Search
CPC .......... F16B 2/065; F16B 2/14; F16G 11/025; F16G 11/04
See application file for complete search history.

(56) References Cited

U.S. PATENT DOCUMENTS 1,988,829 A     1/1935  Bird
2,025,556 A  *  12/1935  Stahl ................... F16G 11/048
                                              29/517
(Continued)

FOREIGN PATENT DOCUMENTS

DE     202013101806 U1    5/2013
WO       2005035407 A2    4/2005

OTHER PUBLICATIONS

Electroline End Fittings & Swivela for Wire & Synthetic Rope, 1406 Fifth Street SW, Canton Ohio 44702, pp. 1-40, www.esmet.com.

(Continued)

*Primary Examiner* — Jason W San
(74) *Attorney, Agent, or Firm* — Harris Beach PLLC; Neal L. Slifkin

(57) ABSTRACT

A cable gripping apparatus comprising a plurality of jaw members, each jaw member being tapered on an outer surface thereof from a larger first end to a smaller second end, said plurality of jaw members being configured to receive and grip a cable therebetween. A cylindrical collar having external threads and a tapered internal bore is receivable of the tapered jaw members in the tapered internal bore. A cylindrical turnbuckle body having a threaded bore is receivable of the threaded cylindrical collar entirely within the turnbuckle bore. The cylindrical collar, plurality of jaw members, and cable gripped therewithin define collectively a collar sub-assembly receivable within the turnbuckle bore. When the turnbuckle body is rotated, the collar sub-assembly is moved axially within the threaded bore of the turnbuckle body, thus changing the tension in the cable.

6 Claims, 5 Drawing Sheets

(51) Int. Cl.
*F16B 2/14* (2006.01)
*F16G 11/02* (2006.01)
*F16G 11/04* (2006.01)

(56) References Cited

U.S. PATENT DOCUMENTS

| | | | | |
|---|---|---|---|---|
| 2,217,400 | A | * | 10/1940 | Gallagher ............. F16G 11/025 |
| | | | | 403/308 |
| 2,357,733 | A | * | 9/1944 | Guderian ............. F16G 11/048 |
| | | | | 191/44.1 |
| 2,463,144 | A | | 3/1949 | Buchanan |
| 2,965,944 | A | * | 12/1960 | Moran .................... B64D 17/52 |
| | | | | 24/115 R |
| 3,163,904 | A | | 1/1965 | Ziolkowski |
| 3,278,210 | A | | 10/1966 | Sanders |
| 3,374,511 | A | * | 3/1968 | Barker .................... F16G 11/04 |
| | | | | 403/369 |
| 3,852,850 | A | * | 12/1974 | Filhaber ................ F16G 11/048 |
| | | | | 24/115 M |
| 3,858,991 | A | | 1/1975 | Burtelson |
| 3,868,748 | A | * | 3/1975 | Kelly ...................... E04C 5/122 |
| | | | | 24/115 M |
| 3,879,147 | A | * | 4/1975 | Morell .................... E04C 5/122 |
| | | | | 24/115 M |
| 3,952,377 | A | | 4/1976 | Morell |
| 4,367,568 | A | * | 1/1983 | Weiser .................... E04C 5/122 |
| | | | | 24/122.6 |
| 4,395,798 | A | * | 8/1983 | McVey .................... D07B 1/185 |
| | | | | 24/122.6 |
| 4,455,717 | A | * | 6/1984 | Gray ...................... F16G 11/14 |
| | | | | 24/115 M |
| 4,627,762 | A | | 12/1986 | Scotti |
| 4,671,695 | A | | 6/1987 | Scotti |
| 4,899,499 | A | | 2/1990 | Hoekstra |
| 5,015,023 | A | | 5/1991 | Hall |
| 5,022,780 | A | * | 6/1991 | Shaw ...................... F16G 11/05 |
| | | | | 24/122.3 |
| 5,233,730 | A | * | 8/1993 | Milne .................... E21D 21/008 |
| | | | | 24/115 M |
| 5,347,777 | A | | 9/1994 | Sudduth |
| 5,369,849 | A | | 12/1994 | De France |
| 5,450,657 | A | * | 9/1995 | Georgopoulos ....... G09F 3/0317 |
| | | | | 24/115 M |
| D423,913 | S | | 5/2000 | Dougan, Jr. |
| 6,226,841 | B1 | * | 5/2001 | Lin ......................... F16G 11/00 |
| | | | | 24/115 R |
| 6,733,203 | B2 | | 5/2004 | Carlsen et al. |
| 7,043,801 | B2 | * | 5/2006 | Toimil .................... F16G 11/106 |
| | | | | 24/136 R |
| 7,198,253 | B2 | | 4/2007 | Striebel et al. |
| 7,581,909 | B2 | | 9/2009 | Szoke |
| 7,716,800 | B1 | * | 5/2010 | Percheron ............... E04C 5/122 |
| | | | | 24/122.3 |
| 7,823,344 | B2 | | 11/2010 | Shin |
| 8,051,615 | B2 | | 11/2011 | Mathews et al. |
| RE43,194 | E | | 2/2012 | Toimil |
| 8,286,309 | B2 | * | 10/2012 | Landry .................. F16G 11/048 |
| | | | | 24/122.6 |
| D683,614 | S | | 6/2013 | Toimil et al. |
| D706,117 | S | | 6/2014 | Toimil et al. |
| 9,194,155 | B2 | | 11/2015 | Landry |
| 9,233,508 | B2 | * | 1/2016 | Hall ........................ B29C 70/86 |
| 9,249,577 | B2 | | 2/2016 | Ross |
| 9,540,219 | B2 | * | 1/2017 | Heinrichs ................. B66D 1/34 |
| 9,869,056 | B2 | * | 1/2018 | Fukuda .................... D07B 9/00 |
| 9,874,016 | B2 | * | 1/2018 | Sorkin .................... E04C 5/122 |
| 2003/0178611 | A1 | | 9/2003 | Anderson |
| 2003/0213948 | A1 | | 11/2003 | Striebel et al. |
| 2004/0040123 | A1 | * | 3/2004 | Tillitski ................... F16G 11/06 |
| | | | | 24/136 L |
| 2005/0071958 | A1 | | 4/2005 | Toimil |
| 2005/0207838 | A1 | | 9/2005 | Striebel et al. |
| 2008/0302035 | A1 | | 12/2008 | Shin |
| 2010/0178113 | A1 | * | 7/2010 | Tjader ...................... E21B 7/205 |
| | | | | 405/184.3 |
| 2011/0084180 | A1 | | 4/2011 | Toimil et al. |
| 2014/0138596 | A1 | * | 5/2014 | Ross ....................... E04F 11/1859 |
| | | | | 256/47 |
| 2014/0230599 | A1 | * | 8/2014 | Chen ....................... F16C 1/101 |
| | | | | 74/502.6 |
| 2018/0030832 | A1 | * | 2/2018 | Abreu .................... E21D 21/008 |
| 2018/0035830 | A1 | * | 2/2018 | Arakawa ................. A47G 1/20 |
| 2019/0165496 | A1 | * | 5/2019 | Toivanen ................. F16B 2/065 |

OTHER PUBLICATIONS

Raileasy Cable Railing System With Patented Tensioner, Bezdan, pp. 1-12, geobezdan.com.
Cable Art Inc.—Feeney Cablerail Assemblies. pp. 1-2, http://www.cableartinc.com/feeney2/assemblies.php.
Feeney Architectural Products Catalog 2008, pp. 1-73.

* cited by examiner

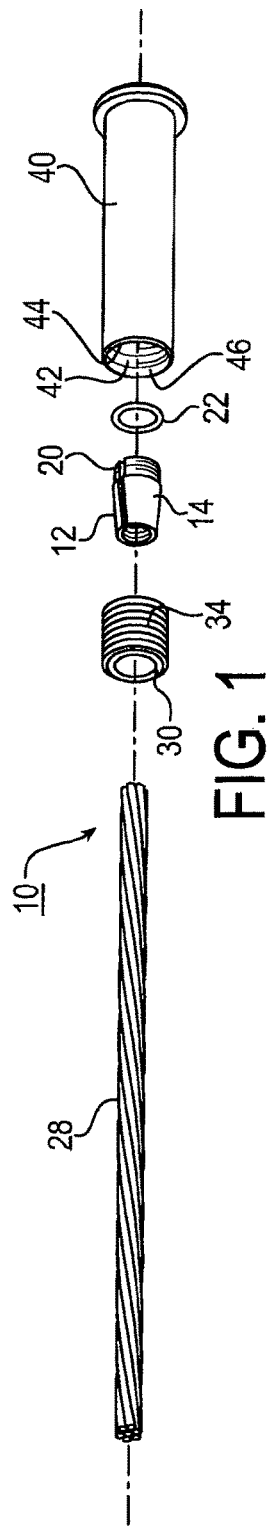
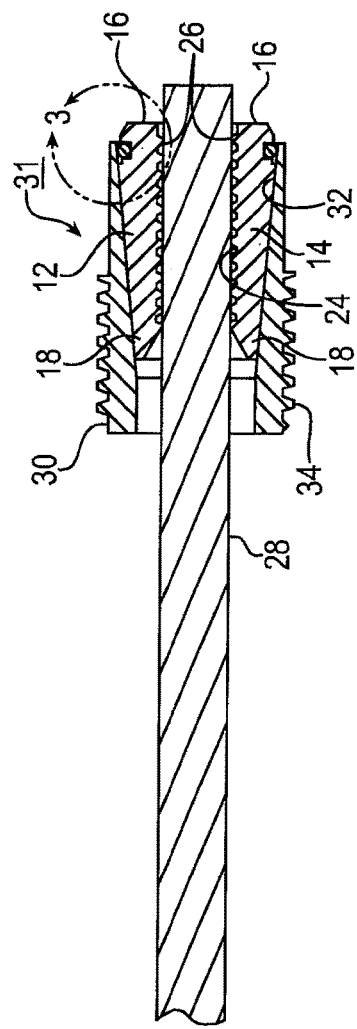
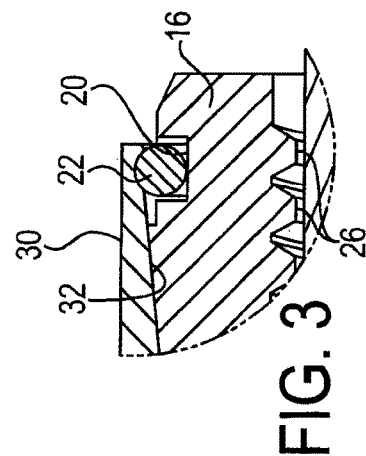
FIG. 1
FIG. 2
FIG. 3

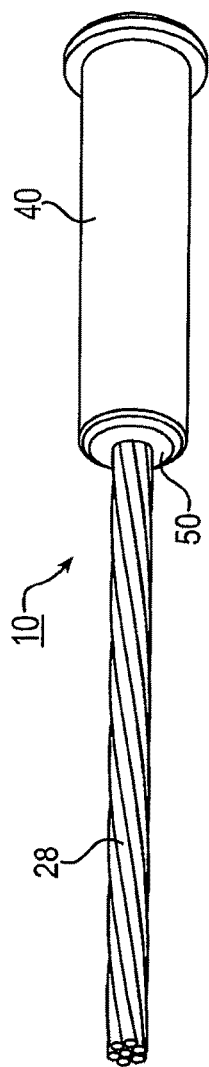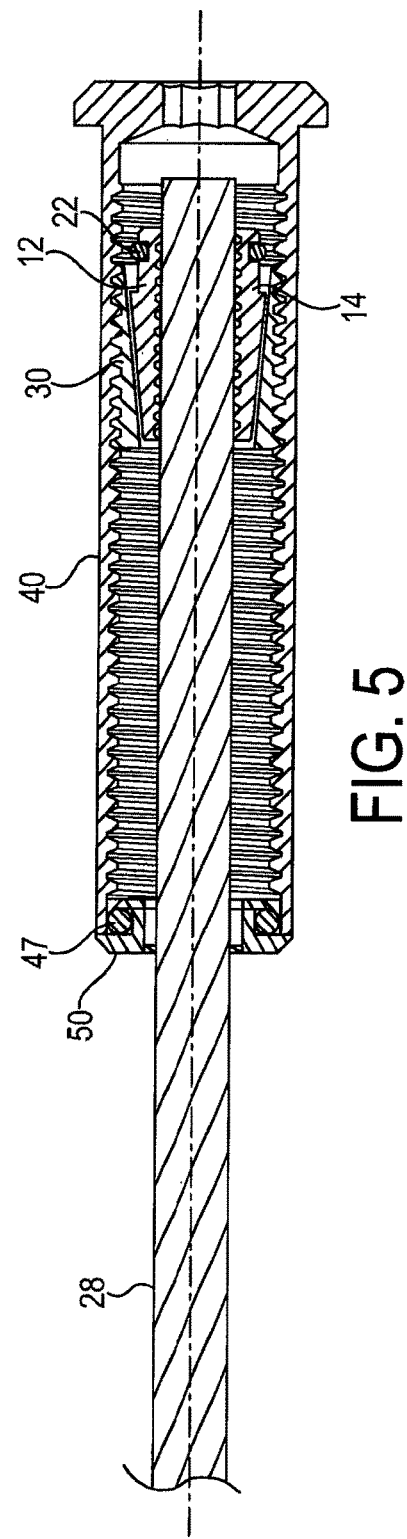
FIG. 4
FIG. 5

SWAGELESS TURNBUCKLE ASSEMBLY

RELATIONSHIP TO OTHER PATENTS AND APPLICATIONS

The present application draws priority from U.S. Provisional Patent Application No. 62/355,998, filed Jun. 29, 2016, which is incorporated by reference in its entirety.

FIELD OF THE INVENTION

The present invention relates generally to an improved cable gripping apparatus for use in attaching cables between posts or the like; more particularly, to such an apparatus for tensioning such an attached cable; and most particularly, to such an apparatus operative to attach and tension a cable between two points on a structure without requiring use of a swaging ferrule and swaging tool, while allowing the installer to make easy adjustments to the length and tension of the cable.

BACKGROUND OF THE INVENTION

A conventional cable railing system comprises a plurality of vertical posts with cables attached to and extending between the posts. Typically, it is desirable to keep the cables under tension, and the attachment hardware is designed such that tension in the cables may be adjusted at, the time of installation or thereafter as may be needed.

A typical turnbuckle system comprises a first male threaded fitting swaged onto the end of a cable of appropriate length attached to a first post and a second male threaded fitting attached to a second post. The first and second threads are opposite threaded (left hand and right hand threads). A turnbuckle body having left and right hand internal female threads is installed onto the first and second threaded fittings, which turnbuckle body by being rotated serves to draw on the cable between the turnbuckle body and the first post, thereby tensioning the cable.

Such existing devices are necessarily complex, expensive, and difficult to install in the field, requiring a first swaging step of the cable (which may also require both a swaging ferrule and a swaging tool) followed by assembly into a turnbuckle for the second step of tensioning of the secured cable as may be desired.

It is known to avoid the first swaging step in devices for securing the end of a cable, but such devices typically relinquish the turnbuckle function, as shown in the following examples.

US Patent Application No. 2014/0230599 by Chen, filed Apr. 25, 2014, discloses a cable connection device comprising an outer barrel, an inner connecting member, and a tube, wherein an outer thread is arranged at one end of the tube, and a cone portion is arranged inside the end of the tube having the outer thread tapered inwardly; an inner thread arranged at one end of the outer barrel is screwed with the outer thread of the tube, and a flange is arranged inside the end of the outer barrel away from the inner thread; and two flexible latches of the inner connecting member are disposed inside the cone portion, and an outer convex ring arranged between two ends of the inner connecting member is against the flange adjacent to the inner thread. The flexible latches are compressed by the cone portion to fasten one end of a cable passed through the tube.

A shortcoming of this apparatus is that it makes no provision for further tensioning of the cable after the cable has been secured into the tube because the outer thread of the tube is free at only one end and is captive to the tube at its other end.

US Patent Application Publication No. 2011/0084180 by Toimil et al., filed Oct. 13, 2010, discloses an interchangeable, self-locking, cable gripping and adaptive anchoring apparatus comprising a gripping component and adaptor component. The adaptor component comprises a receiving side for a fitting or anchoring device, and a connector side to engage with a cable or the like. The gripping component comprises a housing having a cable receiving end and dispatching end. The housing holds cable gripping elements comprising a spring, spacer, and two jaws, within a tapering bore of the housing. At the dispatching end, the housing comprises an internal bore for engaging around the connector side of the adaptor component. The gripping component is spring-loaded and self-locking for securing a cable. The pressure of the adaptor component connector side against the spring, spacer, and jaws, locks the inserted cable in place to allow the cable to move in only one direction. The adaptor component engages flush against the housing to contain the housing components.

A shortcoming of this apparatus is that once the cable is gripped within the housing and the adaptor component is inserted fully into the housing, there is no provision for moving the cable further axially within the anchoring apparatus as is required to tension the cable. The cable may be further tensioned only by rotating the entire gripping component assembly, including the cable, on the fitting or anchoring device threaded into the receiving end of the adaptor component.

Therefore, there exists a need to provide a simple, easily assembled, cable gripping and tensioning apparatus comprising an integral turnbuckle assembly wherein, a cable is gripped by elements within the turnbuckle body itself and may be advanced axially within the turnbuckle body as may be desired in a separate step after the cable is gripped, which apparatus can be used to adjust the tension and length of the cable easily by the installer in the field.

SUMMARY OF THE INVENTION

A cable gripping and tensioning apparatus is provided which includes a plurality of jaw members, preferably two. The jaw members taper from a larger first end to a smaller second end. The plurality of jaw members are configured to receive the cable therebetween in an internal bore formed jointly or collectively by the plurality of jaw members, which bore may include threads or other features to assist in gripping the cable.

A cylindrical collar free at both ends is provided having external threads and having a tapered internal bore adapted to receive the plurality of tapered jaw members. When the cable is inserted into the internal bore of the jaw members, and the jaw members are inserted into the tapered internal bore of the cylindrical collar, the jaws are urged against the cable to hold it in place and the jaws are axially immobilized within the tapered internal bore of the threaded cylindrical collar.

The cable may be inserted into the jaw members either before or after the jaw members are entered into the tapered internal bore of the cylindrical collar.

A turnbuckle body has a threaded bore adapted for receiving the external threads of the collar entirely within the threaded bore such that when the turnbuckle body is rotated, the collar moves axially within the threaded bore of the turnbuckle body, taking with it the plurality of jaws and the gripped cable, and thus causing adjustment of tension in the cable.

In one embodiment, the cable gripping apparatus includes ridges in the tapered internal bore of the collar to engage a surface of at least one of the jaw members.

In another embodiment, the cable gripping apparatus includes a pawl in the collar adapted to engage a portion of at least one of the jaw members to prevent axial disengagement of the jaw members from the tapered internal bore of the collar.

In yet another embodiment, the jaw members of the cable gripping apparatus include a groove proximate the larger first end and further include an O-ring adapted to be received in the groove. The inner diameter of the collar also may include a mating groove to also receive the O-ring.

DESCRIPTION OF THE DRAWINGS

The foregoing and other objects, features, and advantages of the invention, as well as presently preferred embodiments thereof, will become more apparent from a reading of the following description in connection with the accompanying drawings in which:

FIG. 1 is an exploded perspective view of a first embodiment in accordance with the present invention;

FIG. 2 is a longitudinal cross-sectional view of a portion of the embodiment shown in FIG. 1, showing a cable inserted into the jaw members, and the jaw members inserted into the collar;

FIG. 3 is a detailed cross-sectional view taken from Circle 3 in FIG. 2, showing the relationship among the O-ring, collar, and jaw members;

FIG. 4 is an assembled perspective view of the present invention, including a sealing cap not previously shown;

FIG. 5 is a longitudinal cross-sectional view of the embodiment shown in FIG. 4;

DETAILED DESCRIPTION OF THE INVENTION

Figure 6:
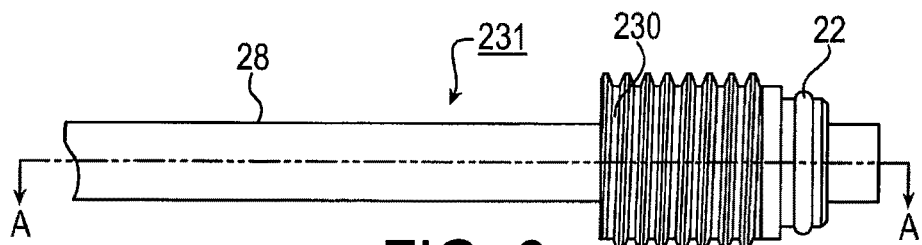
FIG. 6 is a side elevational view of a portion of a second embodiment in accordance with the present invention.

FIGS. 1 through 14 illustrate various embodiments of the present invention in which a novel attachment and tensioning apparatus 10 for use with, e.g., a cable railing system, is shown.

Referring now to FIGS. 1 through 5, a first embodiment 10 in accordance with the present invention comprises a plurality (two shown) of jaw members 12,14 having a larger first end 16 and a smaller second end 18. Optionally, jaw members 12,14 include a circumferential groove 20 for receiving an optional O-ring 22. O-ring 22 serves to hold jaw members 12,14 in close proximity to each other for ease of installation of the jaw members into tapered bore 32 of cylindrical collar 30. Jaw members 12,14 cooperate to define an internal bore 24 with optional features 26 therein to assist in gripping cable 28. Cylindrical collar 30 includes external male threads 34. A turnbuckle body 40 is provided with internal female threads 42 in bore 44 that match threads 34. Collar 30 is threaded into turnbuckle body 40 and is adapted to be received completely inside of turnbuckle body 40.

In a first method of operation, optional O-ring 22 is placed in groove 20 of jaw members 12,14. Cable 28 is placed into collar bore 32. Jaw members 12,14 are placed on cable 28 and inserted into collar bore 32, defining a collar sub-assembly 31 that itself is threaded into bore 44 of turnbuckle body 40.

In a second method of operation, jaw members 12,14 are inserted into collar bore 32, and collar 30 is threaded into turnbuckle body 40. The apparatus is now ready to receive an end of cable 28.

The first and second methods of operation arrive at the same status wherein the cable is being gripped by the jaw members within the collar within the turnbuckle body. To adjust the length and tension of cable 28, turnbuckle body 40 is rotated either clockwise or counterclockwise such that collar sub-assembly 31 is moved axially within turnbuckle body 40. Collar sub-assembly 31 is held completely within turnbuckle body 40.

Optionally, cap 50 may be installed onto cable 28 via a central aperture in the cap prior to either of the above assembly procedures and then threaded into turnbuckle body 40 to seal cable attachment and tensioning apparatus 10.

Figure 7:
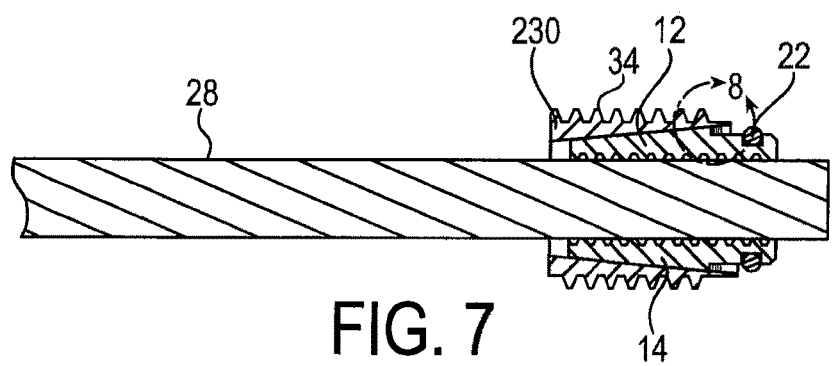
FIG. 7 is a longitudinal cross-sectional view of the second embodiment taken along the line A-A in FIG. 6.
Figure 8:
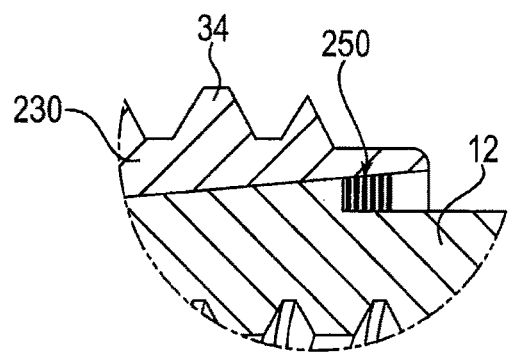
FIG. 8 is a detailed cross-sectional view of a portion of the second embodiment shown in FIG. 7.

Referring now to FIGS. 6 through 8, in a second embodiment 231 of a collar sub-assembly in accordance with the present invention, collar 230 includes internal ridges 250 that grip jaw members 12,14 to hold them in place and prevent them from sliding axially out of collar 230 during assembly.

Figure 9:
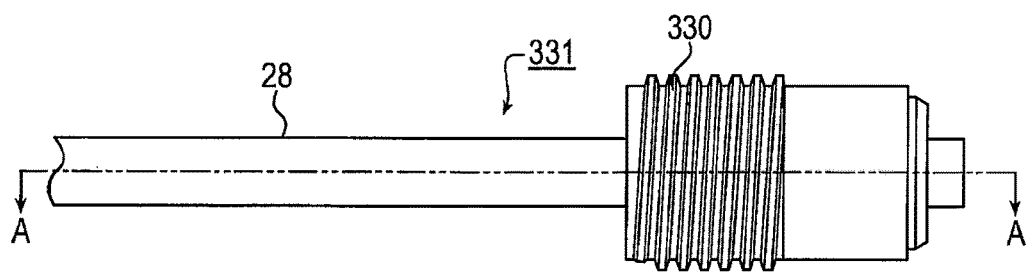
FIG. 9 is a side elevational view of a portion of a third embodiment in accordance with the present invention.
Figure 10:
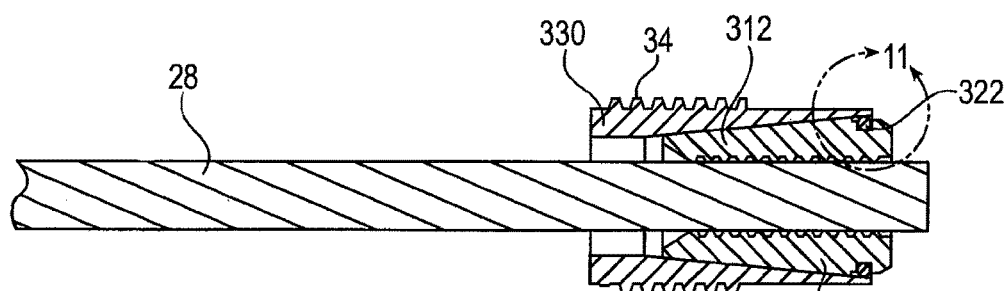
FIG. 10 is a longitudinal cross-sectional view of the third embodiment taken along the line A-A in FIG. 9.
Figure 11:
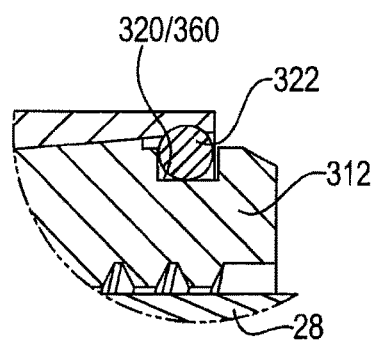
FIG. 11 is a detailed cross-sectional view of a portion of the third embodiment shown in FIG. 10.

Referring now to FIGS. 9 through 11, in a third embodiment 331 of a collar sub-assembly in accordance with the present invention, collar 330 includes a circumferential groove 360 matable with a corresponding groove 320 in jaw members 312,314. When jaw members 312,314 are inserted into collar 330, O-ring 322 is seated within groove 320/360 to hold jaw members 312,314 in place during assembly.

Figure 12:
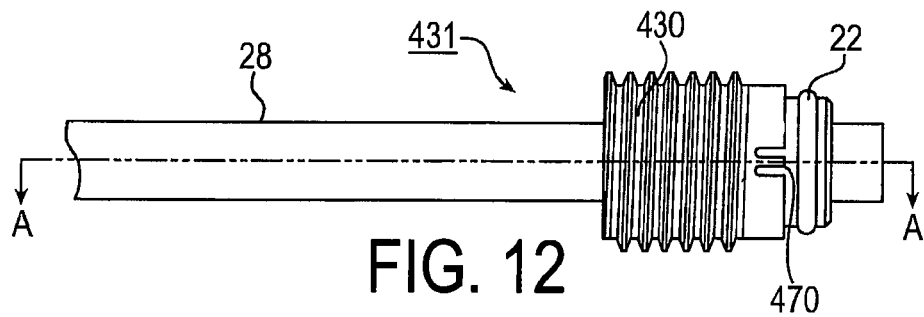
FIG. 12 is a side elevational view of a portion of a fourth embodiment in accordance with the present invention.
Figure 13:
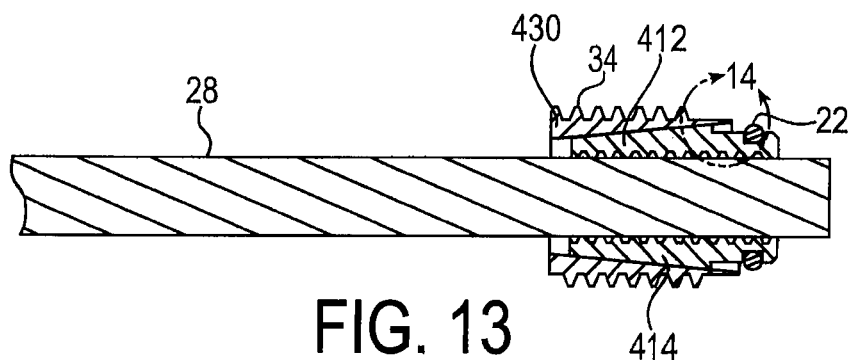
FIG. 13 is a longitudinal cross-sectional view of the fourth embodiment shown in FIG. 12.
Figure 14:
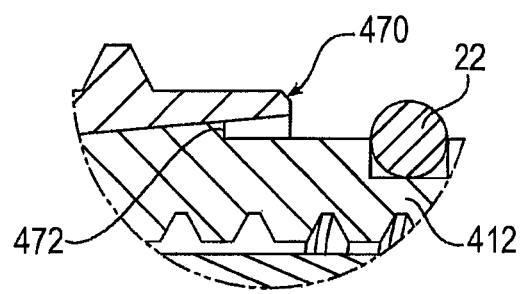
FIG. 14 is a detailed cross-sectional view of a portion of the fourth embodiment shown in FIG. 13.

Referring now to FIGS. 12 through 14, in a fourth embodiment 431 of a collar sub-assembly in accordance with the present invention, collar 430 includes a pawl 470 and the jaw members 412,414 include an external ridge 472. Pawl 470 engages with external ridge 472 when jaw members 412,414 are inserted into collar 430 to prevent jaw members 412,414 from sliding axially out of collar 430 during assembly.

From the foregoing description, it will be apparent that there has been provided an improved method and apparatus for attaching and tensioning a cable. Variations and modifications of the herein described method and apparatus, in accordance with the present invention, will undoubtedly suggest themselves to those skilled in this art. Accordingly, the foregoing description should be taken as illustrative and not in a limiting sense.

What is claimed is:

1. A cable gripping and tensioning apparatus comprising:
   a) a plurality of jaw members, each jaw member being tapered on an outer surface thereof from a larger first end to a smaller second end, said plurality of jaw members being configured to receive and grip a cable therebetween;
b) a cylindrical collar having first and second free ends and having external threads between said first and second free ends and a tapered internal bore therein receivable of said plurality of tapered jaw members in said tapered internal bore; and
c) a turnbuckle body having a threaded bore receivable of said threaded cylindrical collar within said threaded bore,
wherein said plurality of jaw members further comprise a circumferential groove formed in said outer surface thereof and receivable of an O-ring,
wherein tension exerted on said cable urges said plurality of jaw members into locking contact within said tapered internal bore of said cylindrical collar,
wherein said threaded bore of said turnbuckle body is longer than said threaded cylindrical collar such that both of said first and second free ends of said threaded cylindrical collar may be contained simultaneously within said threaded bore of said turnbuckle body,
wherein tension in said cable can be varied by axial movement of said collar within said turnbuckle body at any time while said cable is secured in said collar by said jaw members,
wherein said cylindrical collar, said plurality of jaw members, and a cable gripped therewithin define collectively a collar sub-assembly receivable within said threaded turnbuckle bore, and
wherein rotation of said turnbuckle body causes said collar sub-assembly to be moved axially within said threaded bore of said turnbuckle body to vary tension in said cable.

2. A cable gripping apparatus in accordance with claim 1 further comprising ridges in said inner bore of said collar configured to engage said outer surface of at least one of said jaw members.

3. A cable gripping apparatus in accordance with claim 1 wherein said plurality of jaw members cooperatively define an axial bore therewithin.

4. A cable gripping apparatus in accordance with claim 3 wherein said axial bore is provided with features to assist in gripping said cable.

5. A cable gripping apparatus in accordance with claim 1 further comprising at least one pawl formed in said collar and configured to engage a portion of at least one of said jaw members.

6. A method for changing tension in a cable deployed between two fixed points, comprising the steps of:
a) providing a cable gripping and tensioning apparatus including a plurality of jaw members tapered on an outer surface thereof and configured to receive and grip a cable therebetween, a cylindrical collar having first and second free ends and having external threads and a tapered internal bore receivable of said tapered jaw members, and a turnbuckle body having a threaded bore receivable of said threaded cylindrical collar entirely within said threaded bore;
b) securing a first end of said cable to one of said fixed points;
c) securing an end of said turnbuckle body to the other of said fixed points such that said turnbuckle body is axially rotatable;
d) inserting the second and opposite end of said cable axially into said jaw members within said turnbuckle body; and
e) rotating said turnbuckle body to cause said jaw members to grip said cable and said cylindrical collar to move axially within said turnbuckle body, thereby changing tension in said cable.

* * * * *